United States Patent [19]
Tubergen

[11] Patent Number: 5,650,561
[45] Date of Patent: Jul. 22, 1997

[54] DIAGNOSTIC DEVICE FOR DETERMINING THE PNEUMATIC HEALTH OF A BUBBLE-TYPE FUEL MEASURING SYSTEM

[75] Inventor: Gary A. Tubergen, Frederick County, Md.

[73] Assignee: Pulse Electronics, Inc., Rockville, Md.

[21] Appl. No.: 402,500

[22] Filed: Mar. 13, 1995

[51] Int. Cl.$^6$ ............................................. G01M 3/02
[52] U.S. Cl. .............................. 73/37; 73/202; 73/1.73
[58] Field of Search ............................. 73/1 H, 299, 202, 73/37

[56] References Cited

U.S. PATENT DOCUMENTS

| | | |
|---|---|---|
| 3,587,316 | 6/1971 | Kapteyn . |
| 3,987,675 | 10/1976 | Harrison . |
| 4,002,068 | 1/1977 | Borst . |
| 4,043,193 | 8/1977 | Bailey ............... 73/155 |
| 4,454,759 | 6/1984 | Pirkle ............... 73/299 |
| 4,638,662 | 1/1987 | Watson ............. 73/302 |
| 4,649,739 | 3/1987 | Horner ............. 73/49.2 |
| 4,665,746 | 5/1987 | Sheppard .......... 73/302 |
| 4,669,309 | 6/1987 | Cornelius ......... 73/299 |
| 4,719,799 | 1/1988 | Wicks et al. . |
| 4,840,056 | 6/1989 | Fernandez et al. . |
| 4,949,572 | 8/1990 | Wilen et al. ...... 73/53 |
| 5,115,679 | 5/1992 | Uhlarik . |
| 5,163,324 | 11/1992 | Stewart . |
| 5,251,482 | 10/1993 | Bates et al. . |
| 5,261,276 | 11/1993 | Gifford . |
| 5,309,764 | 5/1994 | Waldrop et al. . |
| 5,471,867 | 12/1995 | Tuma et al. ....... 73/49.2 |

*Primary Examiner*—Hezron E. Williams
*Assistant Examiner*—Jay L. Politzer
*Attorney, Agent, or Firm*—Whitham, Curtis, Whitham & McGinn

[57] ABSTRACT

An improvement on locomotive bubble-type fuel level measuring systems tests or monitors the integrity of the bubble-type pneumatic system by observing the rate of bubble formation, in addition to gauging fuel level. A bubble-type fuel level detection system bubbles a volume of air through a bubble tube. As air exits from the bottom of the tube, bubbles form in the fuel. These bubbles cause small variations in back-pressure in the tube as each bubble grows in size and eventually breaks free from the opening in the tube. The frequency these variations is proportional to the airflow or bubble rate at the bottom of the bubble tube such that pneumatic leaks or other problems can be detected by declaring a problem condition if the bubble rate falls below a predetermined threshold.

18 Claims, 6 Drawing Sheets

DIAGNOSTIC DEVICE FOR DETERMINING THE PNEUMATIC HEALTH OF A BUBBLE-TYPE FUEL MEASURING SYSTEM

DESCRIPTION

BACKGROUND OF THE INVENTION

1. Field of the Invention

The present invention generally relates to detecting air leaks in a fuel measuring system and, more particularly, to determining the pneumatic health of a bubble-type fuel measuring system used in locomotives.

2. Description of the Prior Art

The invention is directed to an improvement for a bubble-type fuel measuring system such as that disclosed in U.S. Pat. No. 4,840,056 to Fernandez et al. which is herein incorporated by reference. The Fernandez et al. system, marketed under the name FUELLINK, is a bubble-type fuel measuring system which gauges fuel by measuring the pressure exerted by the fuel in a bubble tube positioned near the bottom of a fuel tank. The system employs one or more bubbling tubes located at predetermined locations in the tank and positioned at a fixed height from the tank bottom. A predetermined volume flow of air is forced through the tubes. Temperature sensors and pressure transducers periodically measure the temperature of the fuel and the air pressure supplied to the bubbling tubes, respectively. A microprocessor is used to convert temperature and pressure data to first determine the average normalized pressure that the fuel exerts at the bottom of the tank, and then from that, determine the level of fuel remaining in the tank.

Since the volume of air bubbled into the tank is a constant volume, the pressure required to bubble a given volume will be greater the fuller the tank. As fuel is consumed and the fuel level falls, more empty space becomes available in the tank thus reducing the pressure required to bubble the same volume of air into the tank. As can be readily ascertained, the accuracy of such a bubble-type fuel measuring system depends in large part on the pneumatic health of the system. If there are any air leaks in the system whatsoever, the pressure sensed at the bubble tube will be influenced by atmospheric back-pressure thereby making measured fuel readings inaccurate.

SUMMARY OF THE INVENTION

It is therefore an object of the present invention to provide an improved bubble-type fuel level measuring system capable of determining the pneumatic health of the system.

It is yet another object of the present invention to provide a pressure transducer for determining the frequency at which bubbles are formed in a bubble tube to determine the presence of air leaks in the system.

The invention involves a method and apparatus for measuring the rate of formation of bubbles emerging from the bubble tube of a bubble-type fuel level measuring system to determine the presence of leaks and the overall pneumatic health of the system. A bubble-type fuel level detection system bubbles a volume of air through the bubble tube. As air exits from the bottom of the tube, bubbles form in the fuel. These bubbles cause small variations in back-pressure in the tube as each bubble grows in size and eventually breaks free from the opening at the bottom of the tube. A pressure transducer samples the pressure at a periodic rate. The transducer's signal is digitized and the frequency thereof is determined by conventional technologies, such as, for example, Fast Fourier Transform (FFT) or waveform peak counting. The transducer frequency is proportional to the bubble rate emerging from the bottom of the bubble tube such that pneumatic health of the system can be determined by comparing bubble rate to a predetermined threshold and declaring a pneumatic fault condition if the bubble rate falls below the threshold.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
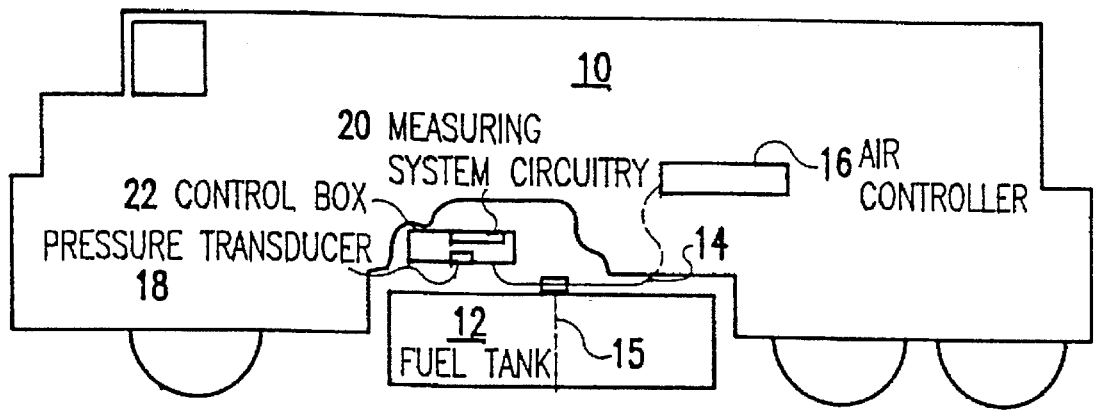
FIG. 1 is side view of a locomotive showing a fuel tank employing a bubble-type fuel level detection system.

Referring now to the drawings, and more particularly to FIG. 1, there is shown a locomotive 10 having a fuel tank 12. An air line 14 supplies a constant volume of air flow to bubble tube 15 via an air flow regulator 16. The more fuel in the tank, more pressure is required to maintain the constant volume of air flow. Conversely, the less fuel in the tank 12, the less pressure is required. A control box 22 has a pressure transducer 18 which is connected to the air line 12 to provide a pressure signal which, together with temperature data, is converted by measuring circuitry 20 into a normalized air pressure and then into instantaneous fuel level. Since fuel level is related to fuel quantity according to the geometry of the tank 12, a look up table or other suitable means is employed to display the instantaneous quantity of fuel remaining to the locomotive engineer.

Figure 2:
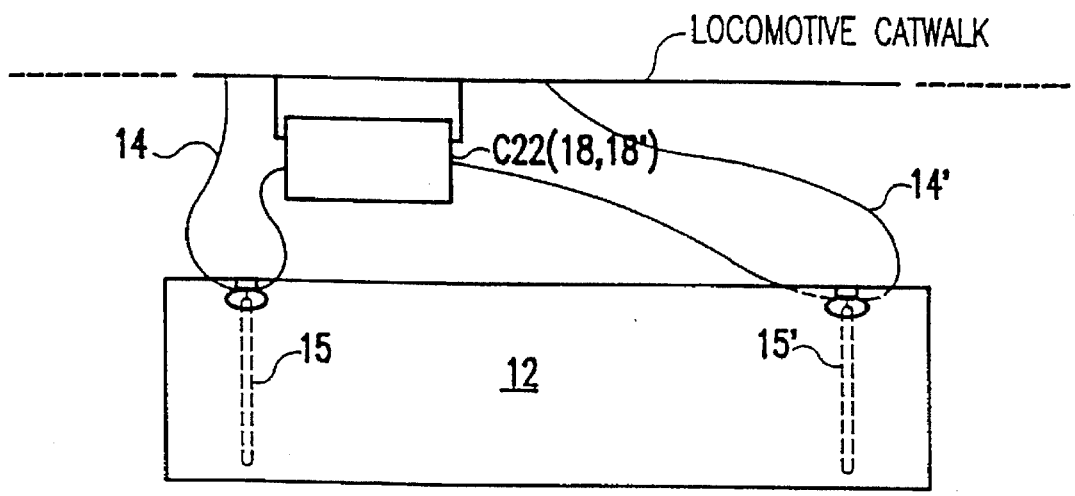
FIG. 2 is a detailed view of a locomotive fuel tank employing a bubble-type fuel level detection system.

In a moving locomotive, level is a relative condition. Determining an accurate fuel level is particularly challenging since the locomotive is not always level, nor do the Newtonian forces of motion exerted on the fuel often promote level conditions. As the locomotive travels along a track to its destination, it accelerates and decelerates, encounters hills, slopes, and curves which, of course, cause the fuel to slosh inside of the tank. This sloshing becomes more turbulent and extreme as the tank empties. For this reason, tanks are often provided with both longitudinal and traverse baffles to minimize fuel movement. Unfortunately, such mechanical remedies do not completely solve the level problem, particularly variations in fuel level due to track grade and track banking. To compensate for these conditions, the bubble rate fuel detection system shown in FIG. 1 is modified in practice to include at least two spaced apart bubble tubes 15 and 15' and two air lines 14 and 14', as shown in FIG. 2. Each of the air lines inputs into a control box 18 and 18'. In this manner, the instantaneous level at various points in the tank are averaged to cancel variations and obtain an actual fuel level reading.

Figure 3:
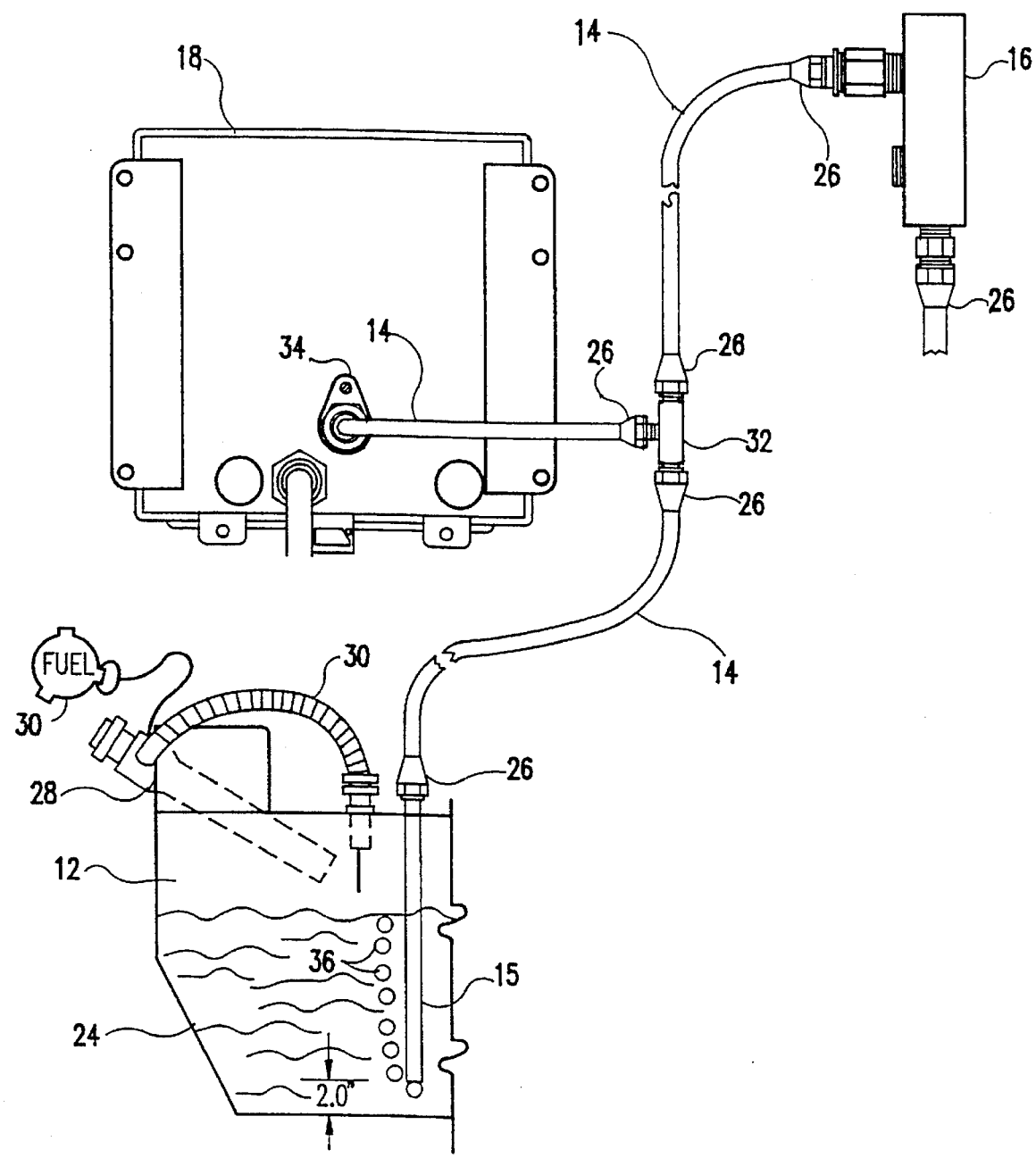
FIG. 3 is a bubble rate detection system including a pressure transducer for determining the rate of bubble formation from which the pneumatic health of the fuel measuring system can be determined.

Referring now to FIG. 3, there is shown a detailed diagram of the improved bubble-type fuel measuring system which, in addition to measuring fuel level also monitors the bubble rate as a means to determine the pneumatic health of the system. A fuel tank 12, shown in cross-section view, holds a quantity of fuel 24 used to power a locomotive. Fuel 24 enters the tank 12 through a fill pipe 28. An overfill tube 30 allows air to escape through the fill pipe 28 during refueling operations. A cap 30 tightly fits over and seals the fill pipe 28. Normally, a vent (not shown) is provided at some location in the tank to vent the fuel system to the atmosphere. A bubble tube 15 is positioned in the tank 12 such that its open end is suspended a fixed distance off the bottom of the tank. In this particular illustration the distance is shown to be two inches. The opposite end of the bubble tube 15 is attached to an air line 14 via coupler 26. The air line 14 originates from a reservoir (not shown) through an air flow regulator 16 which supplies a volume of air to bubble tube 15. A T-connector 32 connects the air line 14 to a control box 18 wherein a pressure transducer 34 measures the pressure within the bubble tube 15. For simplicity, the preferred embodiment is described in terms of a single bubble tube. However, it is understood that in practice, more than one bubble tube 15 may be employed as discussed above in connection with FIG. 2.

In operation the bubble rate fuel level detection system 11 bubbles a volume of air through the bubble tube 15 via air flow regulator 16. As air exits from the bottom of the tube 15, bubbles 36 form in the fuel 24. These bubbles 36 cause small variations in back-pressure in the tube 15 as each bubble 36 grows in size and eventually breaks free from the opening in the tube 15. The pressure transducer 34 samples the pressure in the bubble tube 15 via the air line 14 at a periodic rate. The transducer 34 outputs an electrical analog signal which is digitized. The frequency of the digitized signal is then determined using a suitable transformation method, such as, for example, Fast Fourier Transform (FFT) or waveform peak counting. The transducer frequency is proportional to the airflow or bubble rate at the bottom of the bubble tube 15. Leaks or other problems can be detected by comparing the bubble rate of air sensed bubbling out of the bubbling tube 15 to a predetermined threshold. If the bubble rate falls below the predetermined threshold, a leak is suggested.

Figure 4:
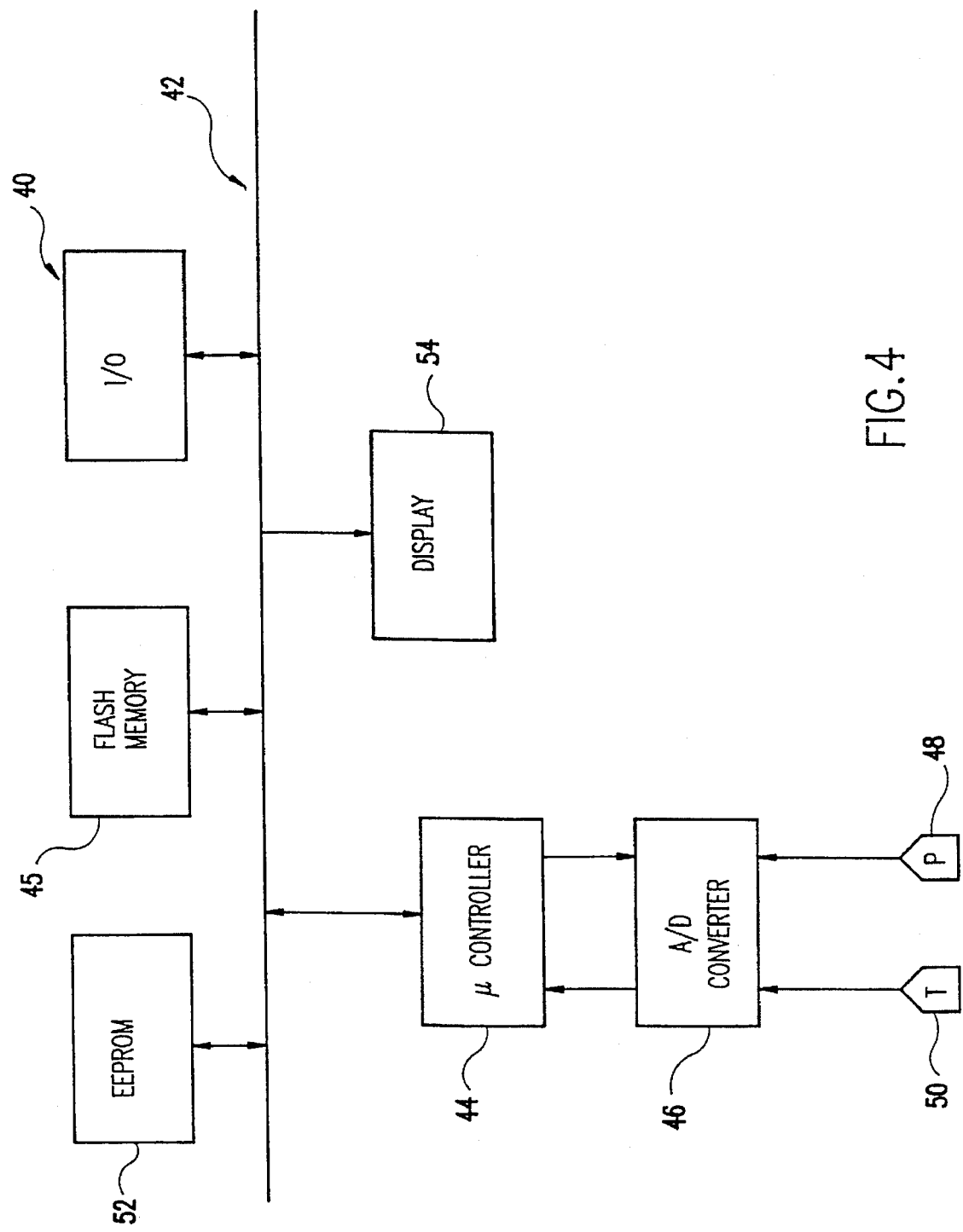
FIG. 4 shows a block circuit diagram of the pneumatic health detection circuitry according to the present invention.

Referring now to FIG. 4, there is shown a block diagram of the fuel system pneumatic health detection circuitry. A more detailed schematic of the general fuel measuring system circuitry can be found with reference to U.S. Pat. No. 4,840,056 to Fernandez et al., previously incorporated by reference. An input/output (I/O) port 40 is connected to various circuit components via a bus 42. The I/O port 40 may be, for example, a keyboard or any other suitable means by which an engineer or technician can enter a command to instruct a microcontroller 44 to enter a diagnostic routine stored in a flash memory 45. Once the diagnostic routine has been initiated, the microcontroller 44 directs an analog-to-digital (A/D) converter 46 to sample the time domain voltage signal of a pressure transducer 48 over a period of time, for example, one minute. The output of a temperature transducer 50 is also connected to the A/D converter 46 to provide an additional parameter which may be used by the system. Preferably, the A/D converter 46 is at least a 12-bit converter necessary for accurately resolving bubble rate.

The microcontroller 44 employs Fast Fourier Transformation (FFT) or some other suitable method to convert the time domain voltage signal of the pressure transducer 48 into the frequency domain from which a bubble rate for bubbles emerging from the bubble tube 15 (FIG. 3) can be determined. An EEPROM memory 52 contains calibration data including a bubble rate minimum threshold value for a pneumatically healthy system. If the detected bubble rate falls below the minimum threshold, the microcontroller 44 declares a pneumatic fault condition which is communicated to the engineer or technician via a display 54.

Figure 5:
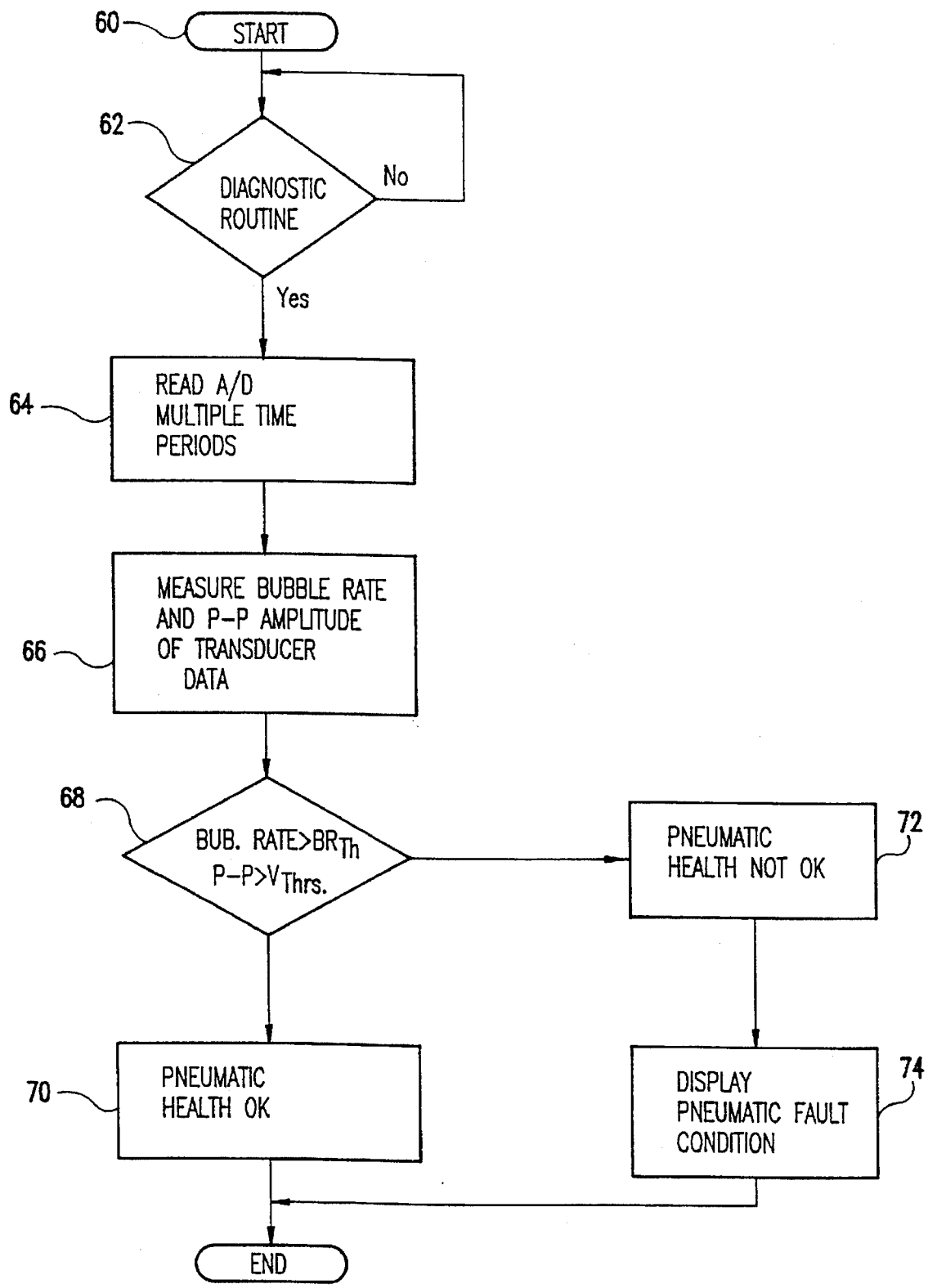
FIG. 5 is a flow diagram showing the logic of the program that the microcontroller uses to determine pneumatic health.

Referring now to FIG. 5, there is shown a flow diagram showing the logic of the program that the microcontroller 44 uses to determine pneumatic health. The flow diagram of FIG. 5 will be described with continued reference to the block diagram of FIG. 4. At the START block 60, a command is input to cause the microcontroller 44 to enter a diagnostic routine. This command may be entered manually by an engineer or a technician interested in verifying the pneumatic integrity of the fuel system, or entered automatically in the case of periodic system self-testing. Once it has been determined that the diagnostic routine has been entered at decision block 62, the microcontroller 44 conducts multiple reads of the A/D converter 46 sampling the time-domain pressure signal from the pressure transducer 48, at function block 64. At function block 66, the microcontroller 44 measures the peak-peak (P—P) voltage amplitude of the time-domain pressure signal. Additionally, a bubble rate is calculated by converting the time-domain pressure signal into the frequency domain. This frequency conversion can be accomplished using, for example, a Fast Fourier Transform (FFT) or any other method adapted for a digital microcontroller. At decision block 68, if the bubble rate is greater than a predetermined threshold (Bubble Rate>$BR_{Th}$), the pneumatic health of the system is declared OK at function block 70. If, on the other hand, the bubble rate is less than the predetermined threshold, the pneumatic health of the fuel system is deemed not OK in function box 72. At function block 74, a pneumatic fault condition is displayed to the engineer or technician, indicating that a probable leak exists in the system. This display may be an affirmative display, such as an LED display on a control panel, or may simply involve blanking out the fuel gauge on the locomotive display panel. To further improve reliability of the system, at decision block 68, an additional condition of comparing the peak-to-peak (P—P) voltage amplitude of the of time-domain pressure signal to a predetermined voltage threshold ($V_{Thres.}$) may be imposed prior to determining the pneumatic health of the system. This helps ensure that the bubble rate is actually a due to a bubbles and not to random noise. In the preferred embodiment, the bubble rate minimum threshold ($BR_{Th}$) has been determined to be one bubble per second, and $V_{Thres.}$ has been determined to be 18 mV.

Figure 6A:
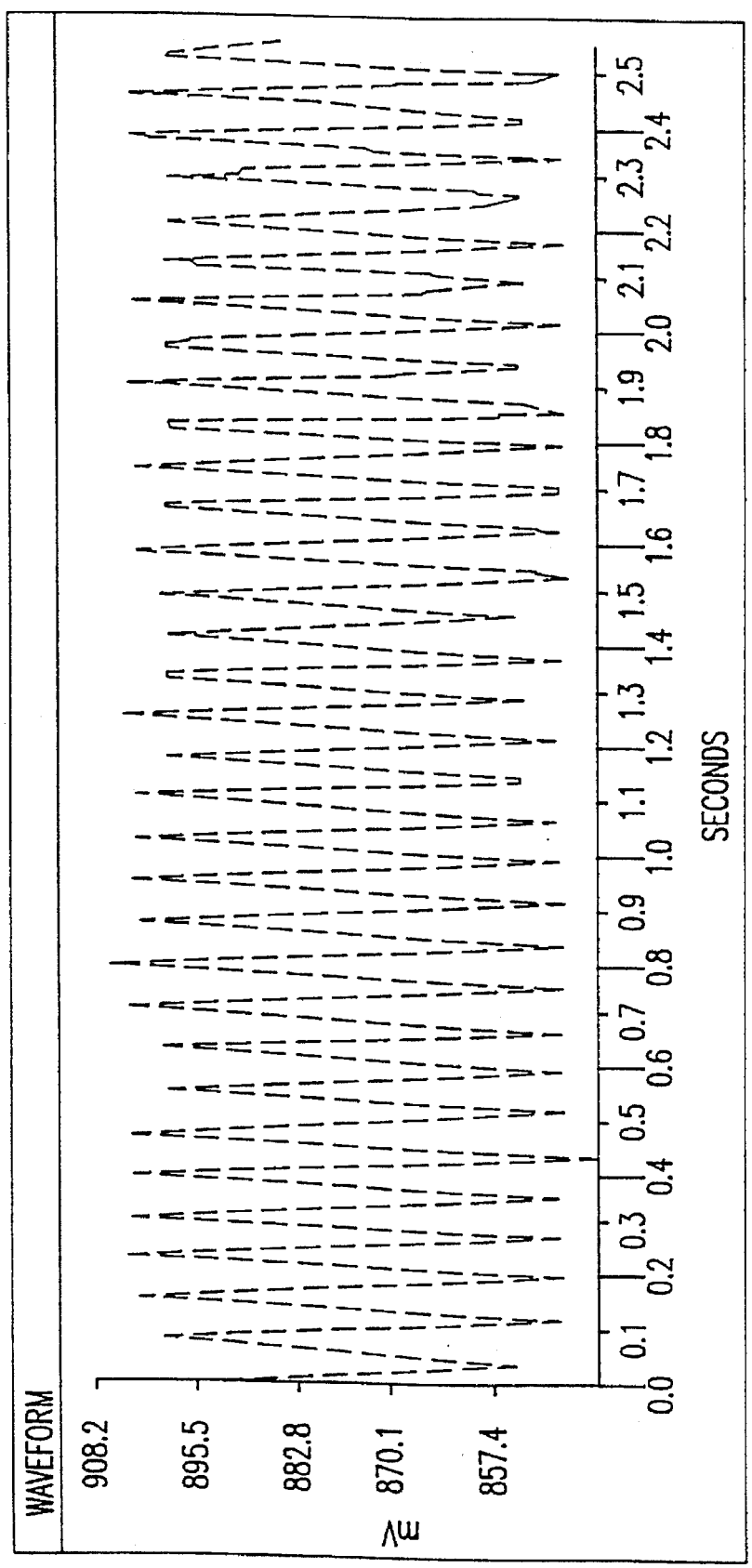
FIG. 6A is an example of a time domain pressure transducer voltage waveform for the present invention.

FIG. 6A is an example of a waveform diagram showing the analog signal obtained by the pressure transducer 48. It is noted that, over time, the time domain pressure signal in the bubble tube 15 varies between around 857 mV to 908 mV. This is approximately equivalent to 0.116 PSI and 0.133 PSI, respectively, at the pressure transducer 48 and has a peak-to-peak swing well above $V_{Thres.}$ of 18 mV. At the beginning of a bubble formation cycle, the pressure signal is low, near 857 mV. As air is supplied to the bubble tube, a bubble is formed in the fuel near the bottom of the tube, and the pressure in the tube begins to rise. When the bubble has reached a certain size and the pressure signal reaches a certain point, in this case near 908 mV, the bubble will break free from the tube and rise to the surface of the fuel.

Figure 6B:
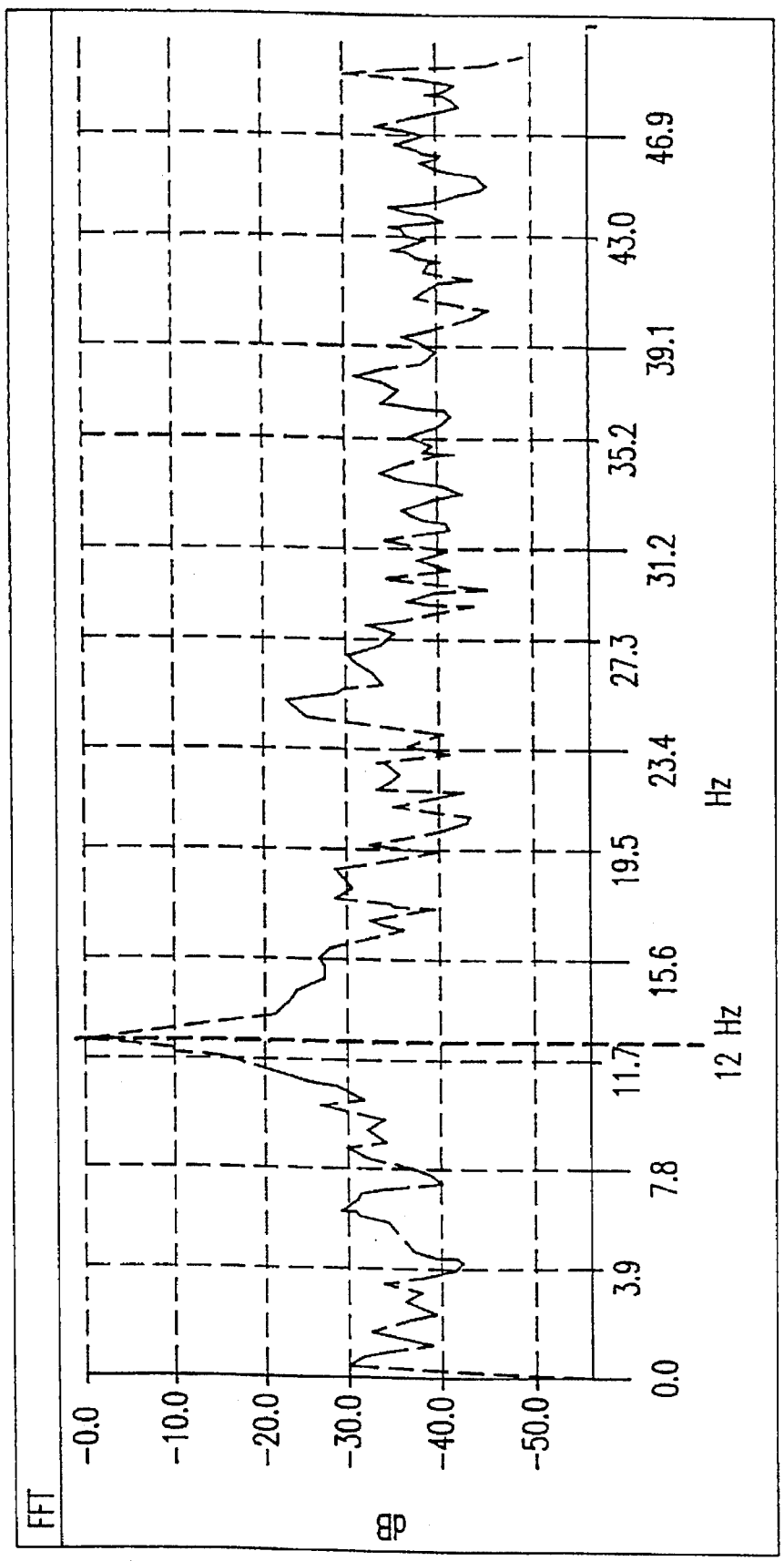
FIG. 6B is the frequency domain transformation of the waveform shown in FIG. 6A showing the frequency or rate of bubble formation.

Referring to FIG. 6B, the waveform of FIG. 6A is shown transformed into the frequency domain using for example a Fast Fourier Transform, or any other method suited to a microprocessor. As seen in this example, a spike at around 12 Hz indicates that a bubble is formed and breaks free from the bubble tube every 1/12 seconds. This is consistent with what would be expected by counting the peaks of the waveform in FIG. 6A over a one second period. The frequency of bubble formation is directly proportional to the air flow from the bottom of the tube for a given temperature, fuel type, and fuel level. Hence, in this case, since the bubble rate is greater than 1 bubble per second and the P—P amplitude of the transducer voltage signal is greater than 18 mV, the pneumatic health of the system is declared OK.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A diagnostic device for determining the pneumatic integrity of a bubble-type fuel measuring system, comprising:

at least one bubble tube mounted in a tank containing a liquid;

means for passing a volume of air through said bubble tube;

a pressure transducer for determining a time domain pressure signal for the air passing through said bubble tube;

means for converting said time domain pressure signal into a frequency domain signal indicating a bubble rate of air bubbles emerging from said at least one bubble tube; and means for comparing said bubble rate to a predetermined threshold to detect a pneumatic fault.

2. A diagnostic device for determining the pneumatic integrity of a bubble-type fuel measuring system as recited in claim 1, further comprising means for activating said diagnostic device.

3. A diagnostic device for determining the pneumatic integrity of a bubble-type fuel measuring system as recited in claim 2, wherein said means for activating is an input/output device manually actuatable by a technician.

4. A diagnostic device for determining the pneumatic integrity of a bubble-type fuel measuring system as recited in claim 2, wherein said means for activating is a control means which periodically activates said diagnostic device.

5. A diagnostic device for determining the pneumatic integrity of a bubble-type fuel measuring system as recited in claim 2, further comprising display means for displaying a pneumatic fault condition if said bubble rate falls below said predetermined threshold.

6. A diagnostic device for determining the pneumatic integrity of a bubble-type fuel measuring system as recited in claim 2 wherein said predetermined threshold comprises one bubble per second.

7. A diagnostic device for determining the pneumatic integrity of a bubble-type fuel measuring system as recited in claim 1 wherein said at least one bubble tube has an open end positioned a fixed distance from a bottom of said tank.

8. A diagnostic device for determining the pneumatic integrity of a bubble-type fuel measuring system as recited in claim 1 wherein said means for converting is a programmed microcontroller using a Fast Fourier Transform (FFT).

9. A diagnostic device for determining the pneumatic integrity of a bubble-type fuel measuring system as recited in claim 1 wherein said system is employed on a locomotive.

10. A method for detecting pneumatic faults in a bubble-type fuel measuring system, comprising the steps of:

mounting at least one bubble tube in a tank containing a liquid;

passing a volume of air through said bubble tube;

measuring the pressure in said bubble tube to provide a time domain pressure signal;

converting said time domain pressure signal into a frequency domain pressure signal to obtain a bubble formation rate; and comparing said bubble formation rate to a predetermined threshold to detect a pneumatic fault condition.

11. A method for detecting pneumatic faults in a bubble-type fuel measuring system as recited in claim 10 further comprising the step of displaying a pneumatic fault condition if said bubble formation rate falls below said predetermined threshold.

12. A method for detecting pneumatic faults in a bubble-type fuel measuring system as recited in claim 10 wherein said predetermined threshold comprises one bubble per second.

13. A method for detecting pneumatic faults in a bubble-type fuel measuring system as recited in claim 10 further comprising the step of comparing a pressure transducer voltage signal to a predetermined voltage threshold prior to declaring a pneumatic fault condition.

14. A method for detecting pneumatic faults in a bubble-type fuel measuring system as recited in claim 10 wherein said predetermined voltage threshold is 18 mV.

15. A diagnostic device for determining the pneumatic integrity of a bubble-type fuel measuring system using a bubble-type fuel level detector, said bubble-type fuel level detector including at least one bubble tube mounted in a tank containing a liquid, means for passing a volume of air through said bubble tube, a pressure transducer for generating a pressure signal corresponding to a pressure in said bubble tube, and a programmed microcontroller connected to receive said pressure signal for generating an output representing a level of said liquid in said tank, said diagnostic device comprising:

an analog-to-digital converter connected to said pressure transducer for generating a time domain pressure signal for the air passing through said bubble tube, said time domain pressure signal being supplied to said microcontroller;

said microcontroller being programmed to perform a diagnostic routine by converting said time domain pressure signal into a frequency domain signal indicating bubble rate of air bubbles emerging from said at least one bubble tube and comparing said bubble rate to a predetermined threshold to detect a pneumatic fault; and display means activated by said microcontroller to display a pneumatic fault condition.

16. A diagnostic device as recited in claim 15 further comprising means for activating said microcontroller to perform said diagnostic routine.

17. A diagnostic device as recited in claim 16 wherein said microcontroller is connected to a system bus and where said means for activating comprises an input/output device connected to said system bus for manual activation by a technician.

18. A diagnostic device as recited in claim 16 wherein said means for activating comprises said microcontroller programmed to periodically perform said diagnostic routine.

* * * * *